Figure 1:
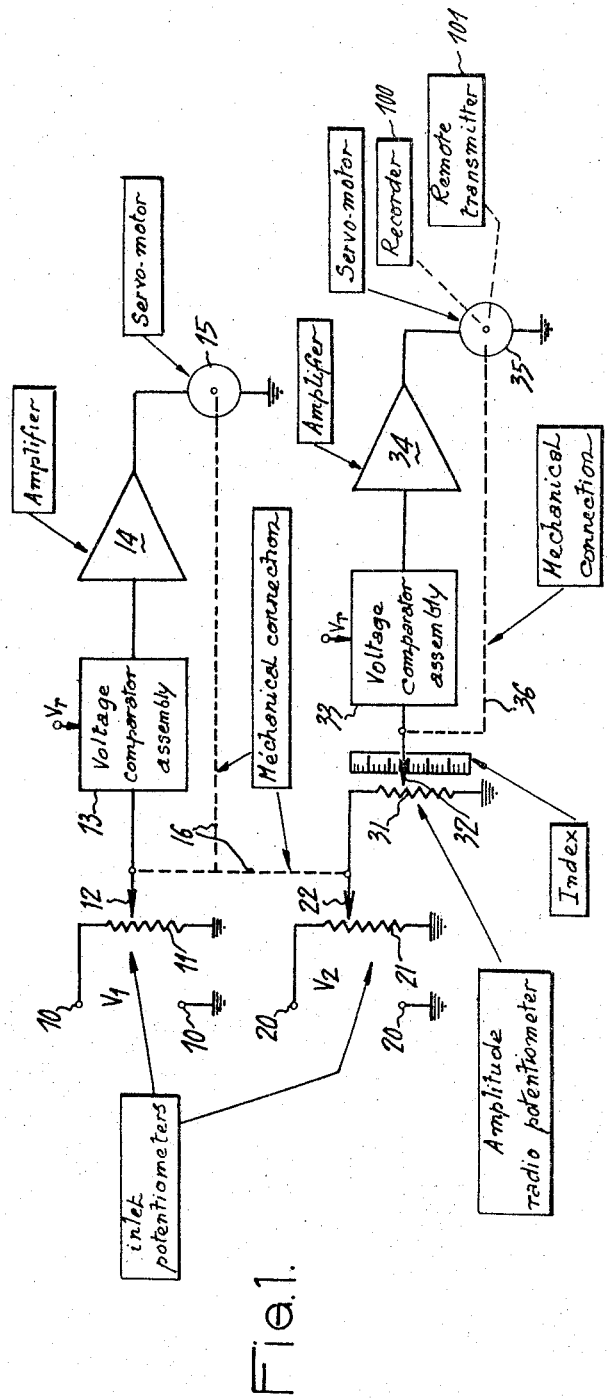

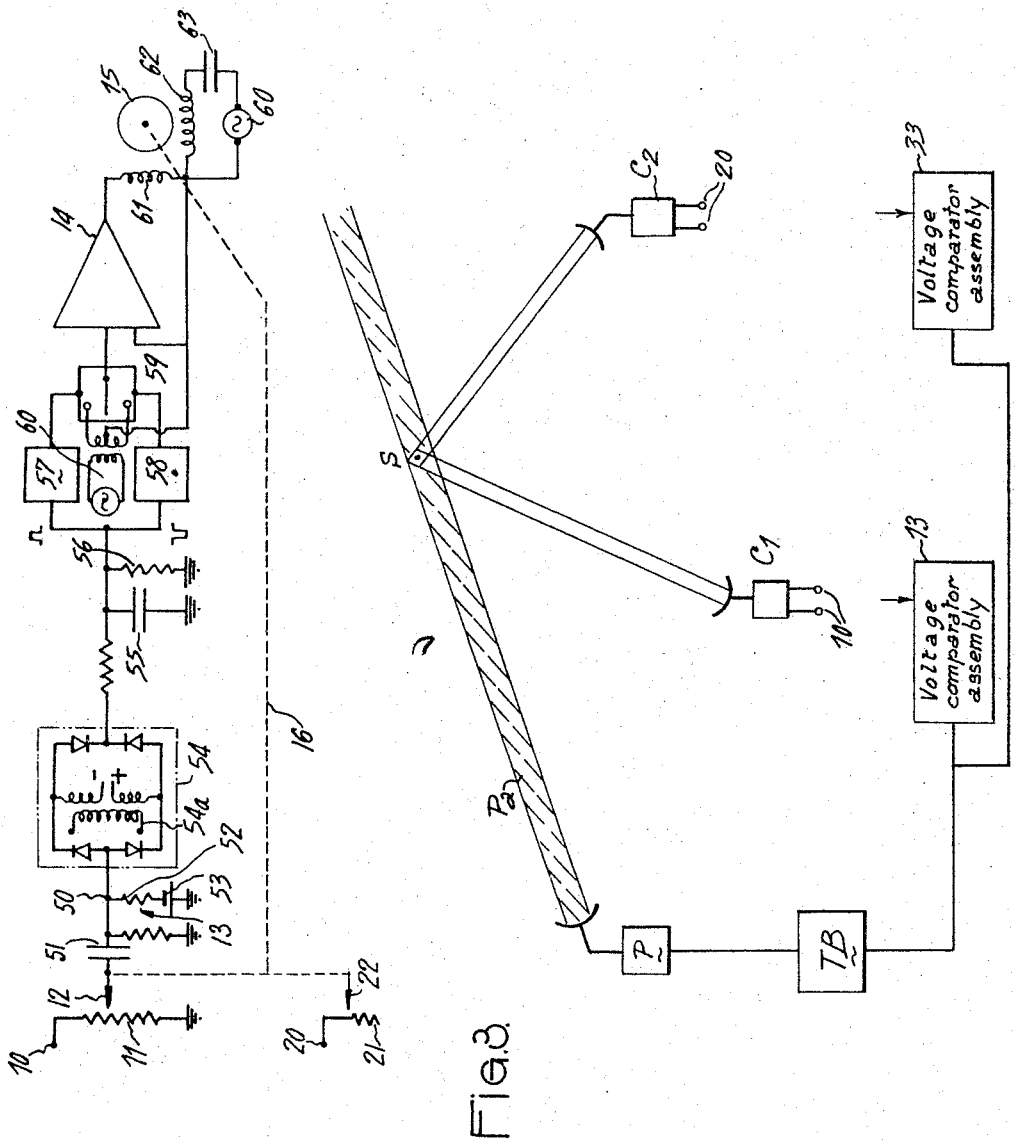

United States Patent Office 3,329,821
Patented July 4, 1967

3,329,821
METHOD AND DEVICE FOR MEASURING THE AMPLITUDE RATIO OF TWO ELECTRIC SIGNALS, MORE PARTICULARLY FOR THE MEASURING OF THE DENSITY OF THE ATMOSPHERE
Daniel Marie René Lesage, Montrouge, France, assignor to Compagnie des Compteurs, Paris, France, a company of France
Filed Nov. 4, 1963, Ser. No. 321,001
Claims priority, application France, Nov. 5, 1962, 914,358, Patent 1,346,364
8 Claims. (Cl. 250—206)

The present invention relates to a method and device for measuring the amplitude ratio of two electric signals, in particular photometric signals, such as those formed by fluxes of light collected by photoelectric cells.

A particular object of this invention concerns the measuring of the average density of the atmosphere by comparing light fluxes received by two photoelectric cells, for instance as taught by the French Patent No. 1,164,631 filed on Nov. 28, 1956.

Another particular object of the invention is to provide methods and devices adapted to measure the amplitude ratio of two electric signals in an entirely automatic manner and with accuracy, even in the presence of the background noise associated with this kind of measurement.

A further object of the invention is to allow the direct reading and also the recording of the information obtained and if desired the transmission of such an information by means of any conventional method of transmission.

The device according to this invention comprises, on the one hand, two identical adjustable voltage dividers or potentiometers, to the terminals of which two signals to be measured are respectively applied, and the slide contacts of which are mechanically connected together or ganged, the position of the slide contact of the first potentiometer being controlled by a servo-circuit so that the voltage at said slide contact is substantially equal to a reference voltage and, on the other hand, a third adjustable voltage divider or potentiometer electrically connected in series to the second potentiometer, and the resistance of which varies according to a known law as a function of the displacement or rotation of the slide contact thereof, the position of said slide contact being controlled by a second servo circuit so that the voltage at said slide contact is substantially equal to a second reference voltage, and the position of this latter slide contact being indicative of the sought ratio of said signals.

The invention will be better understood from the following detailed description which depicts together with the annexed drawing an illustrative and by no means limitative embodiment of this invention.

In said drawing:
FIGURE 1 is a general diagram of a device according to the invention;
FIGURE 2 shows, in greater detail, the servo-circuit for the voltage to be measured relative to a reference voltage; and
FIGURE 3 is a diagram illustrating the invention when worked for the measuring of the average density of the atmosphere.

According to the diagram of FIG. 1, the signals to be measured for their amplitude ratio are applied, in the form of voltages $V_1$ and $V_2$, respectively, to the terminals 10 and 20 of two input potentiometers 11 and 21. The characteristics of these two potentiometers and the variation law of their resistances as a function of the rotation or displacement of the adjustable contacts thereof are identical, such law being, for example, logarithmic. Said slide contacts, referenced 12 and 22, are ganged and assume, in relation to the potentiometer adjusted resistances, homologous positions. Slide contact or runner 12 of first potentiometer 11 is electrically connected to the input of a voltage comparator circuit 13, wherein the voltage at this slide contact is compared with a reference voltage $V_r$, and which supplies a deviation voltage at its output which is proportional to the difference between the reference voltage and the input voltage. Said deviation voltage is used, after being amplified in an amplifier 14, for energizing a servo motor 15 which rotates either in one direction or another according to the direction of the deviation voltage, and drives through a mechanical connection 16, adjustable contact 12 and thus adjustable contact 22 ganged thereto, to adjust the input voltage applied to comparator 13, so that the output deviaion voltage tends to become zero.

On the other hand, adjustable contact 22 is series connected to the winding of a third potentiometer 31, designated in FIG. 1 as the "Amplitude ratio potentiometer," the resistance of which varies as a function of the position of said adjustable contact, according to well known principles. Adjustable contact 32 of potentiometer 31 is electrically connected to the input of a voltage comparator circuit 33, wherein the voltage at said slide contact is compared with a reference voltage which may, for simplification, be selected equal to the above-mentioned reference voltage $V_r$ applied to the first voltage comparator circuit 13. Circuit 33 provides at the output thereof a voltage which is proportional to the difference between the reference voltage and the input and, as formerly, this deviation voltage is used after being amplified in an amplifier 34 for energizing a servo motor 35 which rotates either in one direction or another, which depends upon the direction of said deviation voltage, and drives, through a mechanical connection 36, adjustable contact 32 to adjust the input voltage applied to comparator 33 so that the output deviation voltage tends to become zero.

The amplitude ratio between voltages $V_1$ and $V_2$ is then obtained in the following manner. Denoting by $\alpha_1$ the attenuation of potentiometer 11 when servo motor 15 has substantially reached its equilibrium positoin, i.e., when the voltage at adjustable contact 12 is substantially equal to the reference voltage $V_r$, we then have $V_r = \alpha_1.V_1$.

Since both potentiometers have the same characteristics, the same attenuation $\alpha_1$ is effected by adjustable contact 22 of potentiometer 21, since said adjustable contact assumes on the winding of the potentiometer a position homologous to that of adjustable contact 12. Under such conditions, the voltage at adjustable contact 12 is $\alpha_1.V_2$.

In denoting by $\alpha_3$ the attenuation of potentiometer 31 at the equilibrium when the voltage at adjustable contact 32 is substantially equal to the reference voltage $V_r$, we have $V_r = \alpha_3.\alpha_1 V_2$.

From the two preceding equations, we deduce:

$$\frac{V_1}{V_2} = \alpha_3$$

The attenuation contributed by potentiometer 31 thus directly measures the amplitude ratio of voltages $V_1$ and $V_2$, and its scale may be calibrated so as to give a direct reading of this ratio registering with the position of the slide contact of said potentiometer as this is labelled in FIG. 1 which shows an index member having a graphic scale.

An additional advantage of the device according to this invention is that motor 35 may also drive a recording member 100 or a remote transmission component 101.

In the case where both reference voltages are unequal, it is obvious that this does not alter the principle of measurement, but that the attenuation introduced by potentiometer 31 then only indicates the ratio sought to within a coefficient precisely equal to the ratio of said both reference voltages. However, its scale may be directly calibrated in relation to the voltages $V_2/V_1$.

A more particular embodiment of this invention will now be described in the case of a measurement of the density of the atmosphere where the electric signals are to be phase compared and are pulse voltages. In such an embodiment, the two voltages are supplied by two photoelectric cells referenced $C_1$ and $C_2$ in FIG. 3, such cells being suitably directed for the viewing under equal angles of a point S of a light pencil emitted from a projector P which transmits recurrent pulses of light Pa under the control of a time base known per se and designated TB. The light pulses diffused by the atmosphere are received by said two cells $C_1$ and $C_2$ and converted into electric signals, the offsetting time of which, due ot the difference between the luminous pathways and the delays contributed by the connecting cables, may be reduced to zero by known means, such as a delay line for example. Such means being out of the scope of the invention and further being well-known in the art are not described in a more detailed manner in the present disclosure. The electric pulses thus substantially put into phase and having a recurrence frequency controlled by the time base TB are applied to the terminals 10 and 20 of the measuring device.

FIG. 2 shows in more detail the voltage comparator circuit and the servo circuit associated with one of the potentiometers, potentiometer 11 for example which has a logarithmic variation characteristic. The circuits associated with potentiometer 31 having also a logarithmic variation characteristic in the considered embodiment, are formed in an analogous manner.

As shown, the voltage at adjustable contact 12 of potentiometer 11 is applied via a condenser 51 to a terminal 50 of a resistor 52, in turn series connected to a reference direct-voltage source 53 forming the voltage comparator circuit 13. To terminal 50 is connected an electronic switching circuit 54 controlled by the time base TB of FIG. 3. It can be provided, for example, in the form of a bridge of diodes normally locked and rendered temporarily open by means of the two secondary windings of a transformer 54a, the primary winding of which receives from the time base an unlocking pulse of adjustable width and suitably delayed in relation to the synchronizing pulse used for tripping the transmission of the luminous pulse. The polarization of the two pairs of diodes provided in said bridge is such that circuit 54 conducts, when unlocked by the deviation voltage from terminal 50, whatever may be the polarity thereof. Switching circuit 54 is followed by an integrator circuit 55, for example of the capacitance-resistance type, connected in parallel with a leak resistor 56. The output of integrator circuit 55 is connected to two monostable multivibrators 57 and 58 which are branched together in parallel and are so arranged as to be triggered under the control, for the one 57 of a positive pulse, and for the other 58 of a negative pulse, respectively.

The output pulse from said multivibrators acts upon a member, such as a double-throw change-over switch 59, the switching movable contact of which is connected to servo motor 15, which is of a two phases type, through amplifier 14. Change-over switch 59, shown in electromechanical form, but preferably entirely electronic, enables, when in operating position, reversing the phase of the A.C. voltage supplied by an auxiliary source 60, which is applied to the control phase winding 61 of the two phase motor 15, the fixed phase winding 62 of the latter being energized from A.C. source 60 by a voltage in quadrature by means of a condenser 63. The driving shaft of motor 15 is connected by the mechanical linkage 16 to slide contact 12 of potentiometer 11 and to slide contact 22 of potentiometer 21, both slide contacts being ganged, as aforementioned.

Said comparator and servo circuits operate as follows: the voltage pulse $V_1$, supplied by the first photoelectric receiver, is applied, mixed with the background noise, to potentiometer 11. The attenuated voltage $\alpha_1 \cdot V_1$, picked up by slide contact 12 is compared in circuit 13 with the voltage of reference voltage source 53, so that there appears at terminal 50 a deviation voltage the polarity of which is a function of the algebraic sign of this difference.

Said deviation voltage is applied to switching circuit 54 which is unlocked by the time base only for a short moment so as to select the deviation pulse of the surrounding background noise. On the deviation pulse thus isolated, there remains nevertheless superimposed some background noise which integrator circuit 55 helps to eliminate. The integrated deviation pulse supplied by circuit 55 is then used for tripping, according to its polarity, one of the two monostable multivibrators 57 and 58, which supplies then a pulse of constant width to changeover switch 59. Thus, according to the deviation direction between the votlage $\alpha_1 \cdot V_1$ from potentiometer and the voltage of reference source 53, change-over switch 59 applies to the input of amplifier 14 and control phase winding 61 of servo motor 15 an A.C. voltage of corresponding phase.

I claim:

1. A method for measuring the amplitude ratio of first and second electrical signals comprising the steps of applying said first and second signals respectively to first and second identically adjustable electrical resistances for producing first and second adjusted signals, of providing a first reference voltage having a fixed value, of causing said first adjusted signal to be compared with said first reference voltage for producing a first resultant deviation voltage, of causing said first deviation voltage to adjust to the same extent said first and second resistances until said first deviation voltage is substantially reduced to zero, of supplying said second adjusted signal to a third adjustable resistance having an accurately established characteristic curve for the production of a second stage adjusted second signal, of providing a second reference voltage having a fixed value, of causing said second stage adjusted second signal to be compared with said second reference voltage for producing a second deviation voltage, and of causing said second deviation voltage to adjust said third resistance to reduce said second deviation voltage to zero and to determine the corresponding electric resistance of said third electric resistance from the characteristic curve thereof which resistance corresponds with the amplitude ratio between said first and second electric signals.

2. A method for measuring the amplitude ratio between said first and second electric signals as set forth in claim 1 in which said first and second reference voltages are of the same value.

3. A method for measuring the amplitude ratio between said first and second electric signals as set forth in claim 1 comprising the further steps of amplifying said first and second deviation voltages.

4. Device for measuring the amplitude ratio between two electric signals comprising two indentical potentiometers, each including an adjustable contact and including terminals to which said electric signals are respectively applied, connecting members between said adjustable contacts for the simultaneous adjustment thereof, means for measuring the voltage applied to the adjustable contact of one of said potentiometers and electrically connected therewith, and a third potentiometer electrically connected to said adjustable contact of the other potentiometer, said third potentiometer having an adjustable contact and an index member therefor, means for measuring the voltage applied to said adjustable contact of said third potentiometer, a first constant voltage source, first comparison means for making a comparison between the voltage of said source and the voltage applied to said adjustable contact of said one potentiometer electrically connected with said means for measuring, a second constant voltage source, second comparison means for making a comparison between the voltage of said second source and the voltage in said means for measuring the voltage applied to said adjustable contact of said third potentiometer, adjustment of said contacts of said two identical potentiometers equalizing the voltage of said one potentiometer with the voltage of said first voltage source and the electrical resistance of said two identical potentiometers being equal, adjustment of said contact of said thrid potentiometer providing therein a voltage equal to the voltage of said second voltage source, the position of said contact of the third potentiometer indicating the amplitude ratio of said two electric signals.

5. Apparatus comprising first and second potentiometers of identical electrical characteristics and adapted to receive two electrical signals the ratio of which is to be measured, interconnected movable contacts adapted to make corresponding movements on respective of said potentiometers, a reference voltage source, first comparison means coupled to the contact of said first potentiometer to compare the voltage tapped therefrom with the voltage of said source, servo means responsive to said comparison means to adjust the contact of said first potentiometer to zeroize the voltage tapped therefrom, a third potentiometer coupled to the movable contact of said second potentiometer and including a movable contact, second comparison means coupled to the latter said contact to compare the voltage tapped thereby with the voltage of said source, and servo means responsive to said comparison means to adjust the contact of said third potentiometer to zeroize the voltage tapped therefrom, the adjusted position of the latter said contact indicating the ratio of said two elecrrical signals.

6. Apparatus as claimed in claim 5 comprising a single light source emitting pulses of light and two photoelectric cells inspecting said pulses and coupled to said first and second potentiometers respectively.

7. Apparatus as claimed in claim 6 comprising timing means controlling said light source and said first comparison means.

8. Apparatus as claimed in claim 7 comprising means to determine the polarity of the difference between the reference voltage and voltage tapped from said first potentiometer and to control the operation of the first said servo means in accordance therewith.

References Cited
UNITED STATES PATENTS

| | | | |
|---|---|---|---|
| 2,790,146 | 4/1957 | Livington | 324—140 |
| 2,960,910 | 11/1960 | Pelavin | 88—14 |
| 3,098,194 | 7/1963 | Clemens | 324—99 |
| 3,146,293 | 8/1964 | Lesage | 250—218 X |

RALPH G. NILSON, *Primary Examiner.*

M. A. LEAVITT, *Assistant Examiner.*